United States Patent [19]

Thompson

[11] Patent Number: 4,594,138
[45] Date of Patent: Jun. 10, 1986

[54] FLUID FILTER

[76] Inventor: Donald E. Thompson, P.O. Box 1036, Hughson, Calif. 95326

[21] Appl. No.: 611,311

[22] Filed: May 17, 1984

[51] Int. Cl.⁴ ............................................. B01D 35/06
[52] U.S. Cl. ...................................... 204/302; 204/186
[58] Field of Search .................... 204/302, 304–308, 204/186, 188; 210/748

[56] References Cited

U.S. PATENT DOCUMENTS

| | | | |
|---|---|---|---|
| 1,831,075 | 11/1931 | Neeley | 204/302 X |
| 3,196,095 | 7/1965 | Wadsworth | 204/149 |
| 3,252,885 | 5/1966 | Griswold | 204/302 |
| 3,324,026 | 6/1967 | Waterman et al. | 204/302 |
| 3,398,082 | 8/1968 | Lochman et al. | 204/302 |
| 3,445,376 | 5/1969 | Stenzel | 204/302 |
| 3,544,441 | 12/1970 | Griswold | 204/186 |
| 3,655,550 | 4/1972 | Davies | 204/302 |
| 3,729,402 | 4/1973 | Griswold | 204/302 |
| 3,852,178 | 12/1974 | Griswold | 204/186 |
| 3,891,528 | 6/1975 | Griswold | 204/186 |
| 3,980,541 | 9/1976 | Aine | 204/186 |
| 4,238,326 | 12/1980 | Wolf | 210/695 |
| 4,302,310 | 11/1981 | Watson et al. | 204/186 |

Primary Examiner—John F. Niebling
Assistant Examiner—William T. Leader
Attorney, Agent, or Firm—Edward J. Pavsek, Jr.

[57] ABSTRACT

A filter for removing fine particles from dielectric fluids having a housing adapted for connection in a fluid system for flow of fluids axially therethrough; a plurality of oppositely charged porous electrode plates connected in parallel electrical relation and adapted for connection to a source of direct current electrical energy; and porous filter media disposed between adjacent electrode plates to collect particulate matter.

7 Claims, 9 Drawing Figures

FLUID FILTER

BACKGROUND OF THE INVENTION

1. Field of the Invention

The present invention relates to an apparatus for filtering particulate matter from hydraulic fluids and other dielectric fluids and more particularly to such a filtering apparatus which is adapted to remove fine, particulate matter from hydraulic and other dielectric fluid by the electrostatic floculation of the particles thereof and the capturing of the floc so formed by filter media within the filter.

2. Description of the Prior Art

A number of methods, apparatuses and devices have been previously proposed to remove contaminants, such as particulate matter, from hydraulic fluids, and other dielectric fluids. It has long been known to remove particulate contamination by mechanical filtration. However, such mechanical filtration of particles having a dimension of less than about 5 to 10 microns, known as "fines" in the art, has either been ineffectual due to the relative ease with which such fines travel through the filter medium employed or because the relatively small size of the particles requires filters of considerable bulk and volume to avoid excessive pressure drop within the fluid system due to the necessarily small filter openings required. It has also long been known that some such mechanical filtration also incidentally removes many desirable additives in the fluid.

As an alternative to purely mechanical filtration, a number of different devices have been proposed to remove the fines from the fluids electrostatically by passing contaminated fluid over or through a plurality of electrodes, alternately charged positively and negatively or alternately energized and grounded. In some of the electrostatic filters known in the art, porous filter media are disposed intermediate adjacent electrodes for trapping particulate matter. Filtration is accomplished in one of two or more ways. One manner is the creation of an electric field between two adjacent electrodes whereby the filter medium itself is caused to be charged and to attract the particulate matter to itself. Alternatively, particulate matter is variously charged negatively or positively so that oppositely charged particles will attract to each other to form a floc of larger particulate clumps which may be satisfactorily removed by mechanical filtration.

While many of the prior art electrostatic filters heretofore known and available have been more or less effective for their intended purposes, many of the devices and apparatuses are expensive to construct, bulky or of complicated structure. Further, many of the prior art electrostatic filters are best suited for use in central fluid purifying installations in a substantially stable environment.

Therefore, it has long been known that it would be desirable to have an improved electrostatic filter for removing particulate contaminants from hydraulic fluid and other dielectric fluids and which is adapted for use, for instance, on individual vehicles or the like having fluid systems susceptible of particulate contamination and resultant damage due to wear and blockage of passages caused by such contamination. Moreover, it has long been known that it would be desirable to have such a device which is adapted to be constructed inexpensively and of minimal dimensions; which can be constructed as a disposable, rapidly and easily replaced component in a fluid system; and whose construction permits the deployment thereof within a conventional fluid system without substantial structural modification to the fluid system whereby replacement of the filter requires a minimum amount of labor and time.

OBJECTS AND SUMMARY OF THE INVENTION

Therefore, it is an object of the present invention to provide an improved, electrostatic filter adapted for use in removing particulate contaminants from hydraulic fluid and other dielectric fluids.

Another object is to provide such a filter which is operable effectively to remove even fine particulate matter having a diameter at least as small as about 5 microns.

Another object is to provide such a filter which can be constructed in a variety of forms for use in numerous differing fluid systems, such as hydraulic and other dielectric fluid systems, lubrication systems, and the like in vehicles or machinery.

Another object is to provide such a filter which is adapted to be constructed compactly and which can be deployed within a conventional fluid system without substantial modification thereof.

Another object is to provide such a filter which is of substantially simple structure and function and which can be constructed inexpensively whereby the filter can economically be disposed of at the end of its effective life.

Another object is to provide such a filter which is adapted for quick and easy attachment to the components of an existing fluid system to facilitate the replacement of a used filter by a new one.

Another object is to provide such a filter which can be safely handled during the operation thereof.

Further objects and advantages are to provide improved elements and arrangements thereof in an apparatus for the purposes described which is dependable, economical, durable and fully effective in accomplishing its intended purposes.

DESCRIPTION OF THE PREFERRED EMBODIMENTS

First Form

Referring more particularly to the drawings, the filter of the first form of the present invention is generally indicated by the numeral 10 in FIGS. 1, 2, 3 and 4.

Figure 2:
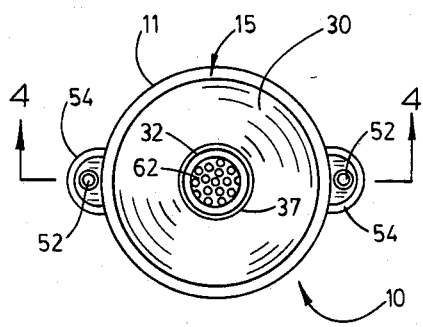
FIG. 2 is a top plan view of the filter of FIG. 1.
Figure 3:
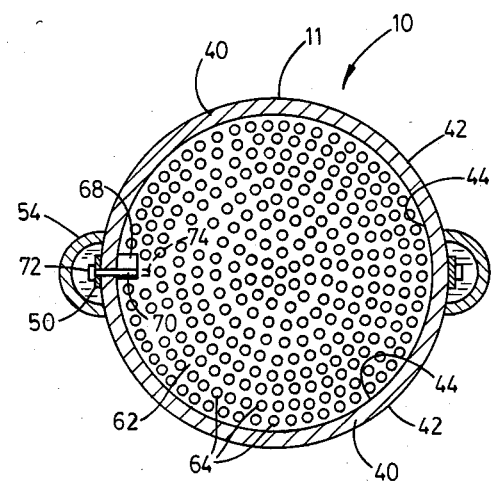
FIG. 3 is a transverse section taken on line 3—3 in FIG. 1.
Figure 4:
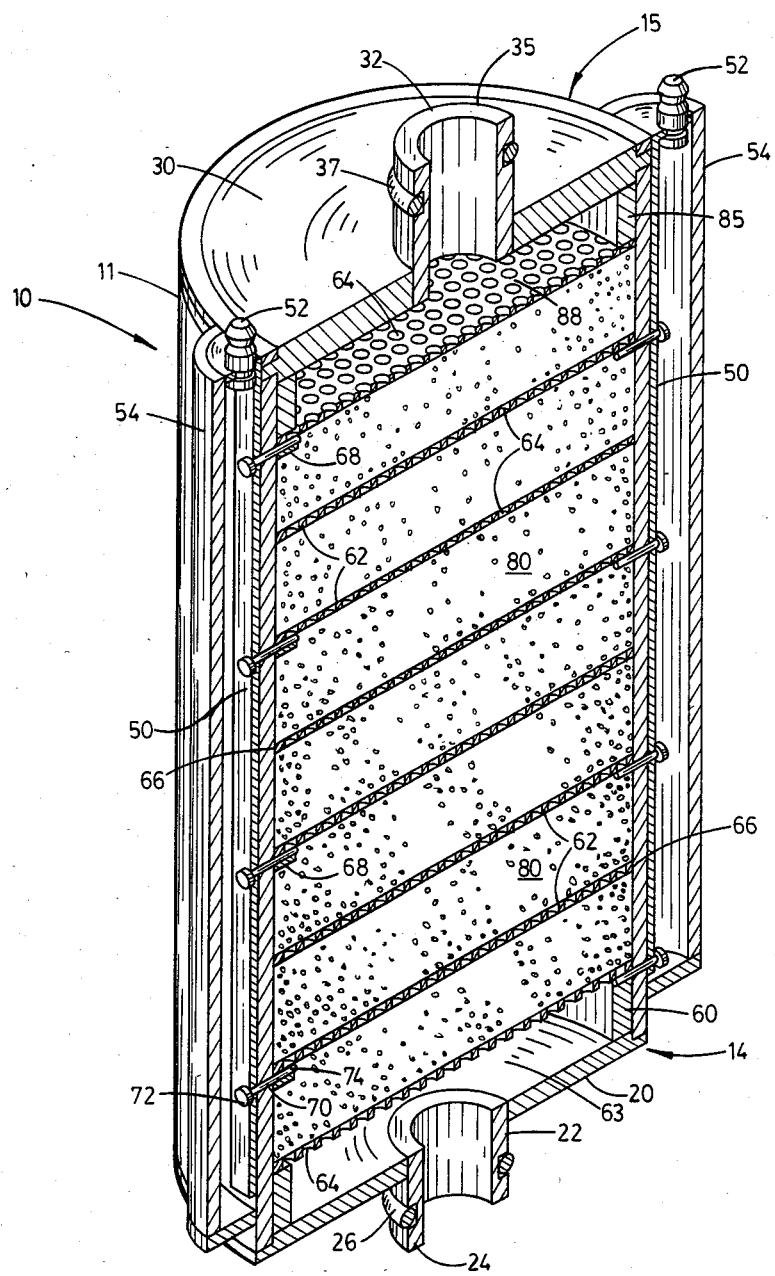
FIG. 4 is a longitudinal section taken on line 4—4 in FIG. 2, shown in perspective.
Figure 6:
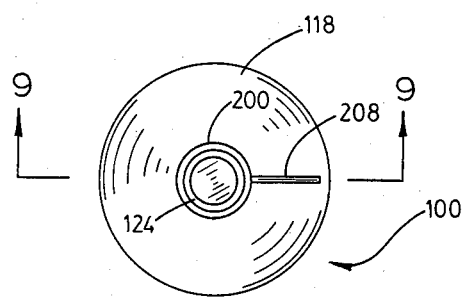
FIG. 6 is a top plan view of the filter of FIG. 5.
Figure 7:
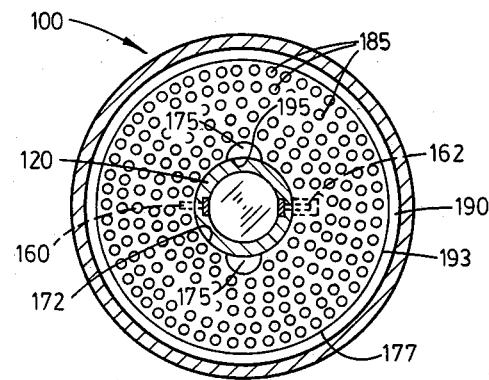
FIG. 7 is a transverse section taken on line 7—7 in FIG. 5.
Figure 5:
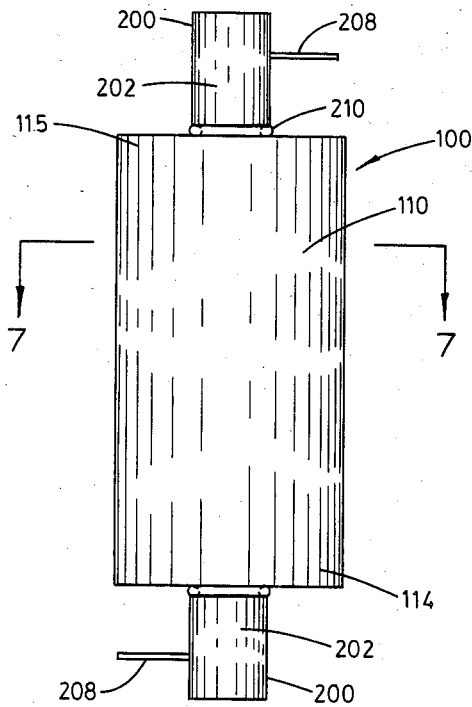
FIG. 5 is a side elevation of a second form of the filter of the preferred embodiment of the present invention.
Figure 8:
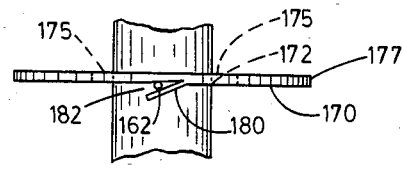
FIG. 8 is a fragmentary, transverse section taken on line 8—8 in FIG. 7.
Figure 9:
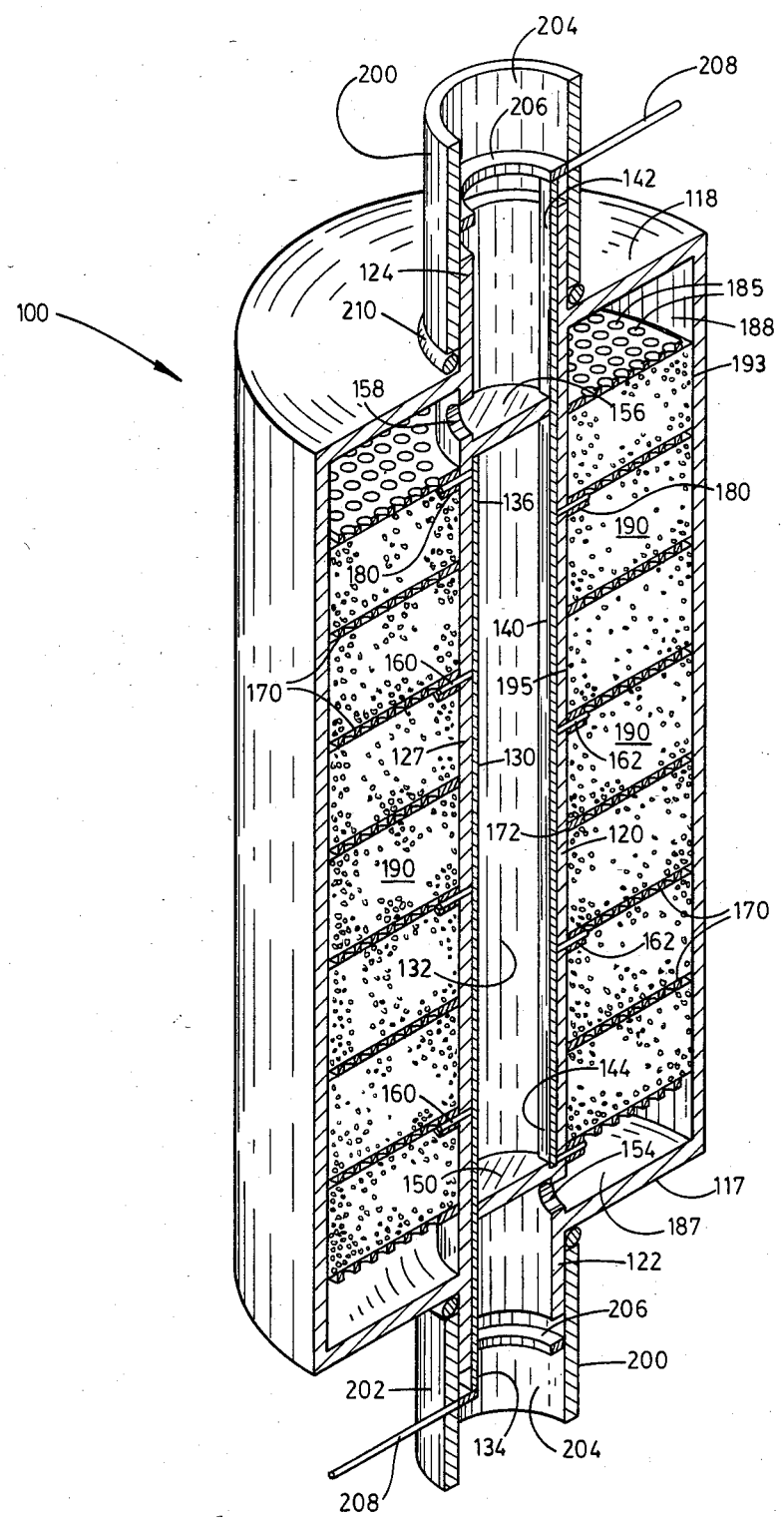
FIG. 9 is a longitudinal section taken on line 9—9 in FIG. 6, shown in perspective.

As shown therein, the filter generally provides a housing or case 11 of substantially cylindrical construction substantially symmetrical about a longitudinal axis, as can best be seen in FIGS. 2, 3 and 4. The case has a first or inlet end portion 14 and an opposite, second or outlet end portion 15 spaced longitudinally therefrom. The case is of predetermined dimensions and provides an interior volume generally related to the anticipated rate of flow of fluids through the particular fluid system in connection with which it is adapted to be used.

Figure 1:
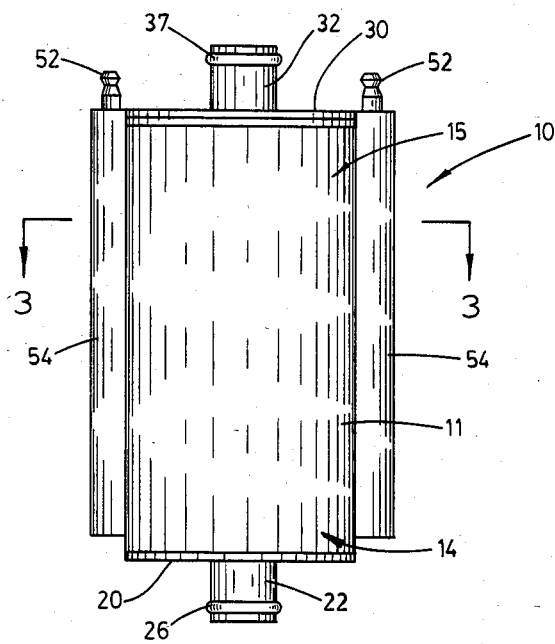
FIG. 1 is a front elevation of a first form of the filter of the preferred embodiment of the present invention.

As can best be seen in FIGS. 1 and 4, the inlet end portion 14 provides a substantially circular end cap member 20 secured in substantially fluid-tight relation on the inlet end portion 14 and having a substantially cylindrical inlet tube 22 disposed substantially centrally thereof. The inlet tube 22 provides a longitudinal axis disposed substantially coextensively with the longitudinal axis of the case 11. The inlet tube protrudes from the end cap 20 to provide an external portion 24 mounting an annular O-ring 26 circumferentially thereabout whereby the external portion 24 can be connected to an appropriate fluid supply conduit (not shown) in snap-fitting or other connective fluid-tight relation for the delivery of fluid from the conduit into the external portion 24 and through the inlet tube 22 into the case.

An end cap 30 of substantially circular configuration is secured on the outlet end portion 15 in substantially close-fitting, fluid-tight relation to the outlet end portion. An outlet tube 32 is deployed substantially centrally thereof and has a longitudinal axis disposed substantially coaxially with that of the inlet tube 22. The outlet tube provides an external portion 35 extending axially from the end cap 30 and mounts an O-ring or annular member 37 in close-fitting, circumscribing relation thereabout. Similarly to the inlet tube 22, the outlet tube 32 is adapted to be connected in fluid-flow relation with the fluid conduit of conventional design in a fluid system to permit the flow of fluid from the case 11 to the conduit, not shown.

The case provides a substantially tubular wall 40 having an exterior surface 42 and an interior surface 44. A pair of elongated, electrically conductive strips or buss bars 50 are adhered diametrically spaced from each other on the exterior surface 42 extending longitudinally from the inlet end portion 14 incompletely toward the outlet end portion 15. An electrically-conductive connector portion 52 is secured in electrically-conductive relation on a predetermined end of each buss bar 50. Preferably, although not necessarily, the connector portions 52 are secured on the ends of the buss bars 50 nearest the outlet end portion 15. The connector portions 52 can be configured and dimensioned as needed for connection to the preexisting electrical system of a vehicle or the like or other conventional source of electrical energy and, as can be seen in FIG. 4 are configured and dimensioned substantially similarly to conventional spark plug connectors. Each buss bar 50 is enclosed along its entire length by a substantially semicylindrical guard or shield 54 constructed of non-conductive material to protect the buss bar against damage and to prevent harm to persons which might otherwise occur in the event of accidental contact of the buss bar by a person during the operation of the filter while the buss bar is energized by an electrical source.

An annular support member 60 is disposed in substantially concentric relation to the interior surface 44 of the wall 40 of the inlet end portion 14 of the case 11.

A porous, substantially planar, electrically-conductive metal electrode 62 having a substantially circular configuration is disposed atop the annular member 60 and is supported thereby. The electrode is spaced from the end cap 20 a predetermined distance to provide a pooling chamber or space 63 of predetermined volume therebetween. The electrode 62 provides a multiplicity of perforations or bores 64 therethrough. The electrode 62 provides a substantially circular, peripheral edge portion 66 having an electrically-conductive retaining tab member 68 projecting slightly obliquely from the plane of the electrode 62 and disposed in proximity to that portion of the interior surface 44 of the wall 40 nearest the buss bar 50.

An electrically-conductive pin member 70 providing a head portion 72 and a distal portion 74 is inserted through the wall 40 to dispose the distal portion 74 thereof in electrically-conductive engagement with the tab portion 68. Preferably, the tab member 68 is dimensioned and configured to permit biasing of the distal portion 74 of the pin member 70 between the tab member and the peripheral edge portion 66 whereby the electrode is prevented against accidental displacement or dislodging and electrical conduction between the buss bar and the electrode is insured.

A filter pad member 80 of substantially circular configuration and predetermined thickness is supported on the electrode 62. Preferably, the filter pad 80 is of a diameter whereby it is disposed in contact with the interior surface 44 of the wall 40 about its periphery. Preferably, the filter pad 80 is constructed of reticulated foam or the like having communicating pores, although any other suitable porous filter medium may be used.

A second electrode 62, constructed in the manner of the first electrode, is supported on the filter pad 80 and the tab 68 thereof is engaged by the distal portion 74 of a pin 70 inserted through the buss bar 50 diametrically opposite that through which the first pin 70 is inserted whereby the application of opposite electrical potentials to the buss bars will oppositely charge the adjacent electrodes. A plurality of similar filter pads 80 and electrodes 62 are similarly disposed alternately in close-fitting, over-laying relation to each other to provide a stack of electrodes and filter pads, as can best be seen in FIG. 4, whereby adjacent electrodes are capable of being charged oppositely of each other by the application of opposite electric charges to the buss bars. The electrodes are preferably spaced axially of each other a distance sufficient to prevent arcing across adjacent electrodes upon the application of an electrical charge thereto.

The electrodes 62 are each attached to the buss bars 50 in parallel electrical relation, whereby each can be charged substantially equally to the others attached to the same buss bar. Further, accidental dislodging of an electrode from a pin will not prevent the remaining connected electrodes from functioning normally.

A second annular member 85 is disposed within the outlet end portion 15 of the case 11 preferably in contact with the peripheral edge portion 66 of the electrode 62 nearest the outlet end portion to retain the stack of electrodes and filter pad members against axial movement within the case in the event of accidental movement thereof or disposition of the filter 10 in an inverted attitude wherein the outlet end portion 15 is disposed lower than the inlet end portion 14 to permit the flow of fluid through the case 11 toward the outlet end portion 15 by gravity. The second annular member 85 serves the further purpose of maintaining the final electrode 62 nearest the outlet end portion 15 in spaced relation from the end cap 30 to define a space 88 of predetermined volume between such electrode and the end cap.

Second Form

The second form of the filter embodying the principles of the present invention is generally indicated by the numeral 100 in FIGS. 5, 6, 7, 8 and 9.

As shown therein, the filter of the second form generally provides a housing or case 110 of substantially cylindrical construction having a first or inlet end portion 114 and an opposite second, or outlet end portion 115 spaced longitudinally therefrom. As can best be seen in FIGS. 6 and 7, the case 110 is substantially circular in transverse cross section. A substantially circular end wall 117 is secured on the inlet end portion in fluid-tight relation thereto. A substantially circular end wall 118 is secured on the outlet end portion in fluid-tight relation thereto.

An elongated, substantially cylindrical tube member 120 providing an inlet end portion 122 and an opposite, outlet end portion 124 is extended through the inlet end wall 117 and outlet end wall 118 to dispose the tube 120 in coaxial relation to the case 110 with the inlet end portion 122 and outlet end portion 124 external thereof. The tube 120 provides an internal portion 127 disposed completely within and axially coextensive of the case 110. Preferably, although not necessarily, the case 110, end walls 117 and 118, and tube 120 are constructed of polyvinyl chloride or other suitable material.

An elongated, first conductive strip or buss bar member 130 is secured on the inner aspect 132 of the tube 120 and has a first end portion 134 disposed within the inlet end portion 122 of the tube and a second, opposite end portion 136 disposed in proximity to the outlet end portion 115 of the case 110 within the tube 120.

A second electrically-conductive strip or buss bar member 140 is secured on the interior aspect 132 of the tube 120 and is of a construction similar to that of the first buss bar member 130. The second buss bar member 140 provides a first end portion 142 within the outlet end portion 124 of the tube 120 and an opposite, second end portion 144 disposed in proximity to the inlet end portion 114 of the case 110 within the tube 120. The second buss bar member 140 is spaced diametrically oppositely of the first buss bar member 130 on the interior aspect 132 of the tube 120.

The tube 120 provides a first deflector or baffle member 150 disposed in sealing relation within the internal portion 127 thereof in proximity to the inlet end portion 114 of the case 110 and spaced slightly internally axially therefrom. A radial bore 154 communicates through the internal end portion 127 of the tube 120 intermediate the baffle member 150 and the inlet end wall 117. A second deflector or baffle member 156 is similarly provided in the internal portion 127 of the tube 120 in proximity to and spaced slightly longitudinally internally from the outlet end portion 115 of the case 110. A second radial bore 158 is provided in the internal portion 127 intermediate the second baffle member 156 and the outlet end wall 118.

A plurality of electrically-conductive rods or pin members 160 extend from the first buss bar member 130 through the tube 120 radially within the case 110. A plurality of electrically-conductive rods or pin members 162 are disposed in electrically-conductive relation to the second buss bar member 140 and extend therefrom radially through the tube 120 within the case 110. As can best be seen by reference to FIG. 9, the pin members 160 and 162 are spaced longitudinally a predetermined distance from each other and are alternately disposed longitudinally along the internal portion 127 of the tube 120.

A plurality of electrically-conductive plates or electrode member 170 are provided. As can best be seen in FIG. 7, each electrode is of substantially circular configuration of a diameter slightly less than that of the case 110. Each electrode has an inner edge portion 172 defining a substantially circular hole therethrough, the inner edge portion having a pair of diametrically spaced, cut-out portions 175 extending radially from the inner edge 172 towards the outer edge 177 of the electrode. The electrode members 170 are substantially planar and provide a tab portion 180 projecting obliquely from the electrode member 170 adjacent the inner edge portion 172, as can best be seen by reference to FIG. 8. Preferably, although not necessarily, the tab portion 180 of each electrode is disposed intermediate the cut-out portions 175 about the circumference of the inner edge 172. The tabbed portion 180 of each electrode member 170 is disposed to define a notch or recess 182 between the tab portion 180 and the electrode member 170. As can best be seen by reference to FIGS. 8 and 9, each electrode 170 is disposed within the case to deploy the electrode member 170 substantially transversely to the longitudinal axis of the case and is positioned to dispose the notch 182 in capturing relation about a pin member 160 or 162, whereby the tab 180 and electrode member 170 are in substantially electrically-conductive relation to such a pin. As can best be seen by reference to FIG. 9, the electrode members 170 are disposed in spaced relation longitudinally of each other within the case whereby adjacent electrode members engage diametrically opposed pin members and are in electrically-conductive relation to opposite buss bar members 130 and 140. Each electrode member 170 is constructed of a material similar to that of the electrode members 62 of the first form of the preferred embodiment and provides a multiplicity of bores or perforations 185 completely therethrough.

As are the electrodes 62 of the first form, the electrode members 170 are connected in parallel electrical relation and are spaced to prevent arcing across adjacent electrodes.

The electrode member 170 nearest the end wall 117 of the inlet end portion 114 is spaced from the end wall a predetermined distance to define and bound a pooling chamber or space 187 of predetermined volume communicating with the radial bore 154. Thus, it will be seen that fluid passing through the radial bore 154 from the inlet end portion 122 of the tube 120 will be caused to pool or accumulate within the space 187 to permit substantially even distribution of such fluid prior to engagement of the electrode member 170 thereby, when the case 110 is disposed in a substantially axially erect attitude.

Similarly, the electrode member nearest the outlet end portion 115 of the case 110 is spaced from the end wall 118 thereof and defines a pooling chamber or space 188 bounded by the electrode member and the end wall. Fluid pooled within the space 188 is thus permitted to be discharged through the radial bore 158 substantially without obstruction to the flow thereof and to prevent stagnation of the fluid which might otherwise occur if the electrode abutted the end wall.

As does the first form of the preferred embodiment, the second form provides a plurality of filter pad members 190 constructed of reticulated foam or other suitable material having communicating pores therethroughout. Each pad member 190 is of predetermined thickness and has an outer edge portion 193 of substantially circular configuration. Preferably, each filter pad member 190 has a diameter substantially equal to that of the interior of the case 110 whereby the outer edge portion 193 of each filter pad is disposed in close-fitting relation with the case.

Each filter pad member 190 further provides an inner edge portion 195 of substantially circular configuration dimensioned closely to be received about the tube 120.

A pair of substantially identical, tubular coupling members 200 are provided for connection of the filter 100 in fluid-flow relation to a flow line (not shown) of a hydraulic or other fluid system. Each coupling member provides a substantially tubular body 202 having a substantially cylindrical inner wall 204 mounting an annular, electrically-conductive ring portion 206. An electrically-conductive conductor member 208 extends in electrically-conductive relation from the ring radially out of the coupling member 200 and is adapted to be connected in electrically-conductive relation to one terminal of a source of DC electrical potential. While the conductor member 208 is illustrated as having a substantially rodlike configuration, it is to be understood that it can also be constructed in the manner of the connector portion 52 of the filter 10 of the first form, or in any suitable form adapted for connection to a preexisting electrical conductor of a conventional source of electrical energy. The coupling member 200 is dimensioned for slidable, close-fitting deployment thereof in fluid-tight relation about either the inlet end portion 122 or outlet end portion 124 of the tube 120, as appropriate. The ring member 206 is positioned to be brought into electrically-conductive relation with a buss bar member 130 or 140 when the coupling member 200 is received upon such end portion of the tube. One or more O-ring members 210 can be provided to insure a fluid-tight seal between the coupling member 200 and the end portion of the tube on which it is received.

OPERATION

First Form

For use as a fluid filter in a conventional dielectric fluid system, and more particularly for use in a hydraulic fluid or lubricating fluid system, the filter 10 of the first form of the preferred embodiment of the present invention is connected in fluid-flow relation to a fluid supply flow line of such system. A fluid delivery line, not shown, is connected in fluid-flow delivering relation on the external portion 24 of the inlet tube 22 of the inlet end portion 14 of the filter 10, employing an appropriate conventional connector. Similarly, a second fluid flow line, also not shown, is connected in fluid-flow receiving relation on the external portion 35 of the outlet tube 32 on the outlet end portion 15 of the case 11. Preferably, although not necessarily, the case 11 is disposed in a substantially axially erect attitude with the outlet end portion elevated above the inlet end portion to afford maximal distribution of the fluid throughout the case and maximal contact of the electrode members and filter pads by the fluid.

A source of DC electrical potential, preferably capable of generating voltage in the range of from about 5,000 to 50,000 volts, is then connected to the connector portions 52. An electrical conductor, not shown, adapted to conduct a positive charge from one terminal of the DC source is connected to either one of the connector portions 52, as desired or appropriate, by conventional means. A second electrical conductor, not shown, adapted to deliver a negative charge is connected by appropriate conventional means to the remaining connector portion 52. Thus, one buss bar 50 will be charged positively by the application thereto of a positive electric charge from the source of DC potential through a connector portion 52, and the remaining buss bar 50 will similarly be charged negatively.

In operation, fluid is permitted to flow through the inlet tube 22 of the inlet end portion 14 from the fluid delivery line, not shown. For most conventional fluid systems, the rate of flow of the fluid will be sufficiently slow such that fluid entering the case 11 from the inlet tube 22 will well or pool between the end cap 20 and first electrode 62 whereby fluid will substantially evenly contact the electrode. As the volume of the fluid entering the case 11 through the inlet tube 22 increases, the fluid will flow axially through the case along a flow path from the inlet end portion 14 toward the outlet end portion 15.

Particulate matter carried within the fluid as a contaminant will be brought into engagement with the electrode 62 as and before it passes through the bores 64 thereof. Particulate matter brought into such engagement will be charged positively or negatively, dependent upon the charge applied to the buss bar 50 connected to the electrode 62 by the pin member 70.

The fluid will pass through the first electrode 62 into the first filter pad 80 whereby some particles of sufficiently large dimensions will be mechanically filtered from the fluid. The fluid passing from the filter pad 80 toward the next, oppositely charged, electrode 62 will cause many of the previously charged particles to be brought into engagement with the oppositely charged electrode. Further, many of the previously uncharged particles will engage the electrode and be charged according to the charge of that electrode. As the fluid progresses within the case 11, oppositely charged particles will be incidentally brought into proximity with each other whereby, due to their respective charges, they will attract each other to form a floc. Progressive increases in size of the floculated particulate matter will result in floc or clumps of greater overall dimension than that of each clump's individual constituent particles. Thus, as the fluid is carried toward the outlet end portion 15, the floc will be of dimensions suitable for filtration by succeeding filter pads 80.

The construction and dimensions of the filter 10 can be widely varied as needed for a particular situation. Further, the number of electrodes and filter pads required may vary from one application to another.

For instance, experimentation has demonstrated that a filter constructed according to the first form of the preferred embodiment of the present invention having a total of 17 electrodes sandwiched about reticulated foam filter pads of a thickness of ⅝ of an inch (1.58 cm.) and having approximately 80 pores per square inch of surface area is effective in substantially eliminating particles of a diameter in the range of from about 0.5 microns to about 10 microns from fluid passing therethrough. Further, it has been experimentally found effective to provide electrodes having apertures or bores having diameters in the range of from about 1/16 of an inch (0.158 cm.) to about ⅛ of an inch (0.317 cm.). However, it will be appreciated that the diameter of the apertures can be less than or greater than those stated without significant loss of efficiency in the operation of the filter.

Further modifications in the construction of the filter of the first form of the preferred embodiment are possible as well. For example, the electrodes can be in the form of screens having substantially rectangular or square openings rather than circular bores as illustrated. Also, for some filtering purposes, it may be desirable to substitute filter pads of differing degrees of porosity for some of the filter pads within the case 11. Filter media of various sorts can be employed within a single filter having a porosity in a range of from about 20 pores per square inch or lower to about 100 pores per square inch or higher, depending upon the type of contamination anticipated to be encountered, the pressure demands of the system, and the relative diameters of the particulate matter desired to be filtered. For instance, the filter pads disposed nearer to the inlet end portion can be of greater porosity than those more remote from the inlet end portion, with progressive decreases in porosity of the filter pads therebetween. In that manner, the mechanical filtration afforded by the filter pads may be maximized with a minimal resultant drop in pressure in the fluid system.

Still further, a plurality of filters constructed accorded to the principles of the present invention can be employed in a single system, either deployed throughout the system remotely from each other or disposed in series or parallel flow relation to each other.

Second Form

The operation of the second form of the preferred embodiment of the present invention is substantially identical to that of the first form. That is, for use as a filter in a fluid system, the filter 100 of the second form of the preferred embodiment of the present invention is first connected in a fluid-flow relation to such fluid system. A coupling member 200 is slid longitudinally over the inlet end portion 122 of the tube 120 and is connected using conventional means in fluid-flow receiving relation to a fluid supply flow line of the fluid system. A coupling member 200 is slid longitudinally over the outlet end portion 124 of the tube 120 and connected to a fluid flow line of the fluid system in fluid delivering relation thereto.

The conductor 208 of the coupling member 200 on the inlet end portion 122 is connected to one terminal of a source of DC electrical potential by appropriate electrically-conductive means whereby a charge either positive or negative can be applied thereto. Similarly, the conductor 208 of the coupling member 200 on the outlet end portion 124 is connected to the oppositely-charged terminal of the source of DC electric potential (not shown) in electrically-conductive relation thereto.

Fluid is caused to flow through the coupling member 200 and the inlet end portion 122. The fluid will engage the baffle member 150 and be directed through the radial bore 154 into the space 187 between the end wall 117 of the inlet end portion 114 of the case 110 and the first electrode 170. The fluid then will well-up or accumulate and subsequently flow axially of the case 110 toward the outlet end portion 115.

As is the case with the first form of the preferred embodiment, the fluid flows axially through the case 110, and particulate matter carried by the fluid is alternately charged positively and negatively and caused to flocculate whereby it can be filtered from the fluid by the filter pads 190.

Filtered fluid collects in the space 188 between the last electrode 170 and the outlet end wall 118 exiting through the second bore 158 whereby it is conducted out of the case through the outlet end portion 124 of the tube 120 and the coupling member 200 mounted thereby.

Thus, it will be seen that the first and second forms of the preferred embodiment of the present invention provide an improved filter adapted for use in removing even the finest particulate contaminants from hydraulic fluid and other dielectric fluids and further provide such a filter which is adapted to be constructed compactly and which can be deployed singly or in multiples in fluid-flow relation within a variety of conventional fluid systems without substantial modification thereof. Moreover, the filter of the present invention can be constructed inexpensively whereby the filter may be disposed of at the end of its effective life. The first and second forms also each provide a filter inherently resistant to malfunction or inadvertent dislocation of its component parts.

Although the invention has been herein shown and described in what are conceived to be the most practical and preferred embodiments, it is recognized that departures may be made therefrom within the scope of the invention, which is not to be limited to the illustrative details disclosed.

Having described my invention, what I claim as new and desire to secure by Letters Patent is:

1. A filter for removing particles from fluids in a fluid system comprising:

a housing having an internal chamber and providing a first, inlet end portion and an opposite, outlet end portion remote therefrom, the inlet end portion being adapted for connection in fluid-flow relation to a portion of the fluid flow system for delivery of fluids from the fluid system into the internal chamber, and the outlet end portion being adapted for connection in fluid-flow relation to a portion of the fluid system for discharge of fluids from the internal chamber to the fluid system to define an axial path of fluid flow through the chamber from the inlet end portion to the outlet end portion;

a plurality of electrically-conductive electrode members spaced axially of each other within the internal chamber, each electrode member having a substantially flat body providing a multiplicity of bores of predetermined dimensions therethrough, the electrode members being disposed substantially transversely of the path of fluid flow, each electrode providing a peripheral edge portion thereabout and having a tab member extending from the peripheral edge portion;

a pair of elongated shield members mounted externally of the housing in spaced relation to each other;

a pair of elongated electrically-conductive buss bar members borne externally of the housing in spaced relation to each other, one buss bar member being connected in electrically-conductive relation to at least one electrode member and having a connector portion adapted to be connected in electrically-conductive relation to a predetermined first terminal of a source of electrical energy of selected electrical potential operative to impart an electrical charge to said at least one electrode member, and the other buss bar member being connected in electrically-conductive relation to the remaining electrode members not connected to the other buss bar member and having a connector portion adapted to be connected in electrically-conductive relation to a second terminal of a source of electrical energy of selected electrical potential operative to impart a substantially equal electrical charge opposite to that imparted to said at least one electrode member to each of the remaining electrode members, the buss bar members individually being borne intermediate the housing and a shield member, the connector portion of each buss bar member being disposed externally of the shield member and the housing;

a plurality of electrically conductive pin members extending from the buss bar members each having an end portion internal of the housing and captured closely between the peripheral edge portion and the tab member of an electrode member in electrically conductive relation thereto, the pin members being connected on the electrode members to dispose alternate electrode members in parallel electrical relation; and porous filter media disposed between adjacent electrode members, the filter media each having a multiplicity of passages therethrough for flow of fluids through the passages and capturing of particles therein.

2. The filter of claim 1 wherein the plurality of electrode members provides a first endmost electrode member disposed nearer the inlet end portion of the housing than are the remaining electrode members, and a second endmost electrode member disposed remotely from the first endmost electrode member in proximity to the outlet end portion; the housing provides a substantially continuously cylindrical internal surface bounding the internal chamber; and retaining means for limiting displacement of the first and second endmost electrode members away from each other including a first member borne in substantially close proximity to the internal surface in engagement with the first endmost electrode member and a second member borne in substantially close proximity to the internal surface in engagement with the second endmost electrode member.

3. The filter of claim 2 wherein the first member and second member of the retaining means are each substantially annular and are disposed substantially concentrically of the internal surface of the housing.

4. The filter of claim 1 wherein the housing provides a substantially cylindrical internal surface bounding the internal chamber; and the filter media are individual, substantially circular pads of reticulated foam each having a peripheral edge disposed in contact with the internal surface of the housing.

5. The filter of claim 4 wherein the filter media disposed in proximity to the inlet end portion have greater porosity than the filter media disposed remotely therefrom.

6. A filter for removing particles from fluids in a fluid system comprising:

a housing having a predetermined first end portion and an opposite, second end portion; a substantially cylindrical internal surface bounding an internal chamber of predetermined volume; a first end cap secured on the first end portion; a second end cap secured on the second end portion;

an inlet tube communicating through the first end cap and adapted for connection to a portion of a fluid system for delivery of fluids to the internal chamber;

an outlet tube communicating through the second end cap and adapted to be connected to a portion of the fluid system for discharge of fluids from the internal chamber to the fluid system;

a pair of electrically conductive elongated buss bar members borne externally of the housing, each buss bar member having a connector portion adapted to be connected to a one of a pair of terminals of a source of electrical energy for delivery of oppositely charged electrical potential to the buss bar members;

a plurality of electrically conductive pin members secured on the buss bar members in spaced relation therealong, each pin member having an end portion extended through the housing into the internal chamber;

a plurality of perforated electrodes mounted internally of the housing in axially spaced apart relation to each other and disposed substantially transversely of the internal chamber, each electrode having predetermined dimensions and providing an edge portion configured to closely conform to the internal surface of the housing, the edge portion of each electrode being biased on the end portion of an individual pin member for connection thereto in electrically conductive relation, adjacent electrodes being connected on pin members secured on different buss bar members to dispose alternate electrodes in parallel electrical relation;

a plurality of porous filter pads individually disposed in close fitting relation between adjacent electrodes, the filter pads each having a peripheral edge portion disposed in close fitting relation to the internal surface of the housing;

a first annular retaining member secured in closely circumscribed relation on the internal surface of the housing in the first end portion thereof and disposed in engagement with the peripheral edge portion of a predetermined first electrode to limit displacement of said electrode toward the end cap of the first end portion;

a second annular retaining member secured in closely circumscribed relation on the internal surface of the housing in the second end portion thereof and disposed in engagement with the peripheral edge portion of the electrode disposed most remotely from the first electrode to limit displacement of the electrode toward the end cap of the second end portion; and a pair of shield members each borne externally of the housing in covering relation to a buss bar member and disposed in non-covering relation to the connector portion thereof.

7. A filter for removing particles from fluids in a fluid system comprising a substantially cylindrical housing having a predetermined first end portion and a second end portion spaced axially therefrom, the housing providing a first end wall disposed in substantially fluid-tight relation on the first end portion and a second end wall disposed in substantially fluid-tight relation on the second end portion, the housing further providing a substantially cylindrical internal surface bounding a chamber of predetermined volume;

an elongated hollow tube disposed substantially coaxially of the housing and mounted thereby, the tube having an internal portion disposed within the housing and opposite external portions substantially external of the housing, the external portions each providing a passage axially therethrough and disposed in fluid-flow relation to the chamber of the housing, a predetermined one of the external portions being an inlet portion adapted for connection in fluid-flow relation to the fluid system for the delivery of fluid through the passage to the chamber, and the opposite external portion being an outlet portion adapted for connection in fluid flow relation to the fluid system for the discharge of fluids from the chamber to define a substantially axial path of fluid flow through the chamber, the internal portion of the tube mounting a pair of baffle members spaced axially of each other and of the end walls, the tube further providing a pair of bores individually spaced intermediate each baffle member and the end wall nearest thereto to define a path of fluid flow radially between the tube and the chamber of the housing;

a plurality of substantially flat, electrically-conductive electrodes mounted transversely in the chamber and spaced axially of each other, each electrode having a substantially circular outer edge portion disposed in proximity to the internal surface of the housing and providing a retaining member, and an inner edge portion received about the internal portion of the tube, the electrodes each providing a multiplicity of holes of predetermined dimensions for the flow of fluid therethrough;

a plurality of filter pads disposed between the electrodes, each filter pad providing a multiplicity of interconnecting passages therethrough dimensioned to permit the flow of fluids through the filter pads and to capture particles carried by the fluid; and a pair of electrically-conductive members mounted internally of the tube and each providing a connecting portion external of the tube adapted for connection to one of a pair of terminals of opposite electrical potential of a source of electrical energy, each further providing a plurality of electrically-conductive pin members spaced axially of each other and having an end portion extending radially from the tube into the chamber of the housing and captured by a retaining member of an electrode to connect each electrically-conductive member in parallel electrical relation to a plurality of non-adjacent electrodes to impart opposite electrical charges to adjacent electrodes.

* * * * *